UNITED STATES PATENT OFFICE 2,288,841

PROCESS FOR PRODUCTION OF RELATIVELY STABLE ALKALI METAL HYPOCHLORITE SOLUTIONS

Burr H. Ritter, Niagara Falls, N. Y., assignor to Hooker Electrochemical Company, Niagara Falls, N. Y., a corporation of New York No Drawing. Application October 26, 1940, Serial No. 363,024

7 Claims. (Cl. 23—86)

My process relates more particularly to production of alkali metal hypochlorites by chlorination of the corresponding hydroxide, as illustrated by the following equation:

$$2NaOH + Cl_2 \rightarrow NaClO + NaCl + H_2O \quad (1)$$

If the chlorination be continued after exhaustion of the hydroxide the products of reaction 1 will be broken down, and hypochlorous acid formed, as follows:

$$NaClO + H_2O + Cl_2 \rightarrow NaCl + 2HClO \quad (2)$$

If reaction 2 be allowed to take place the resulting product is found to be unstable, tending to give up oxygen and liberate HCl, which breaks down more NaClO, and so on, probably resulting in what is known as "chain" reaction. Addition of more of the caustic alkali to bring the solution back to the alkaline side is generally ineffectual in checking this decomposition. Even if the chlorination be stopped at the exact equivalence point of Equation 1, the product will still show a tendency to hydrolyze and form hypochlorous acid. If such solutions are marketed and stored in closed containers pressure will be likely to develop. In other words, if a caustic alkali solution be once chlorinated to complete exhaustion of the caustic alkali the product is generally irretrievably ruined for purposes requiring a hypochlorite of fairly good stability. In the chlorination of caustic alkalis, various methods are therefore employed to ensure a small but definite residual alkalinity.

One obvious way of accomplishing this is to chlorinate under chemical control and stop the chlorination when the caustic alkalinity has been reduced to the exact point desired. This is done by taking out samples from time to time as the chlorination proceeds and testing them with sensitive indicators for caustic alkalinity, such as phenolphthalein in presence of barium chloride, the purpose of the barium chloride being to protect the indicator against the alkalinity of any carbonates that may be present. The disadvantage of this method is that inadvertence is liable to result in chlorination to exhaustion of the hydroxide and this is particularly apt to occur if the chlorination be allowed to proceed while the sample is being tested. As already shown, if this should occur the batch would in all likelihood be ruined.

Another method of ensuring the desired alkalinity is to combine definite quantities of alkali metal hydroxide and chlorine, determined either gravimetrically or volumetrically. This however is not as simple a matter as it may seem, for the reason that chlorine is commonly stored in containers under pressure and it is not practicable completely to empty the container, the affinity of the chlorine for alkalis being such that if the pressure is allowed to fall to atmospheric it is liable to go below atmospheric and draw the hydroxide back into the container. It is therefore commercially impractical to place a weighed quantity of chlorine in a container and allow it to discharge itself into the hydroxide solution, as the flow must be stopped when the pressure begins to fall rapidly. For this reason it is customary to place the container on weighing scales and determine the quantity of chlorine admitted by noting the diminution in weight of the container; but this involves continuous supervision and inadvertence is liable to result in chlorinating beyond the equivalence point.

Alkali metal hypochlorite may be produced with less danger of chlorinating to the acid side by adding a mild alkali, such as sodium carbonate, to the mixture before chlorinating. The chlorination can then be carried to complete exhaustion of the hydroxide, and even to partial chlorination of the carbonate, without going over to the acid side. Partial chlorination of the carbonate results in the following reaction:

$$2Na_2CO_3 + H_2O + Cl_2 \rightarrow NaClO + NaCl + 2NaHCO_3 \quad (3)$$

If some $Na_2CO_3$ remains at the conclusion of this reaction the batch will not have been completely ruined. However, it should be noted that solutions produced in this way, although not acid, have nevertheless been chlorinated to exhaustion of the hydroxide. It is found that the resulting product is less stable than solutions which have never been chlorinated to exhaustion of the hydroxide, and this is still true even though more hydroxide may have been added to restore the caustic alkalinity. Such solutions are unsatisfactory for many purposes. If stored in closed containers, pressure is liable to develop in the container.

I have discovered that the danger of over-chlorination can be avoided and alkali metal hypochlorite solutions of high stability can be produced, without any of the difficulties of control above mentioned, by stopping the chlorination at a point at which an even greater excess of the hydroxide still remains than is desirable in the finished product and then adjusting the alkalinity by converting the surplus hydroxide to its carbonate. I thus produce a solution containing a definite proportion of alkali metal hypochlorite, a definite excess of the hydroxide and a variable proportion of carbonate. The carbonate being inert in the reactions for which the alkali metal hypochlorite is intended, variations in its quantity are of no importance. In this way critical control of the chlorination is avoided and the risk of ruining an entire batch by chlorinating too far is eliminated.

The surplus hydroxide can be converted to its carbonate either by introduction of carbon dioxide or by addition of sodium or other bicarbonate, the reactions in the two cases respectively being as follows:

$$2NaOH + CO_2 \rightarrow Na_2CO_3 + H_2O \quad (4)$$

$$NaOH + NaHCO_3 \rightarrow Na_2CO_3 + H_2O \quad (5)$$

When the surplus hydroxide is to be diminished by admission of $CO_2$ it is of course necessary to exercise a chemical control over this process in order to stop at the right point. However no such risk of ruining the batch by going too far is involved as when chlorine is introduced under similar control, for the following reasons: It has been shown that if the solution is chlorinated beyond exhaustion of the NaOH, reaction 2 follows and this seriously damages the product and renders it unfit for many purposes. If on the other hand, the solution is carbonated beyond exhaustion of the NaOH the following reaction takes place:

$$Na_2CO_3 + H_2O + CO_2 \rightarrow 2NaHCO_3 \quad (6)$$

This does not necessarily damage the product. On the contrary, if reaction 6 is not carried beyond the point of complete exhaustion of the $Na_2CO_3$ the product can be reclaimed and rendered fit for use by adding sufficient NaOH to reconvert the $NaHCO_3$ to $Na_2CO_3$ and supply the excess NaOH necessary to give the product the desired caustic alkalinity.

It has been proposed to produce sodium hypochlorite by chlorinating caustic soda by means of gaseous chlorine derived directly from electrolytic cells and therefore containing $CO_2$; but the $CO_2$ in such gaseous chlorine is ordinarily less than one percent. In the production of commercial liquid chlorine from gaseous chlorine produced in electrolytic cells it is customary to compress and chill the chlorine until it liquefies and draw off liquid chlorine from the bottom of the container. This leaves a certain proportion of the gaseous chlorine uncondensed and in this gaseous chlorine the $CO_2$ is of course concentrated to many times the proportion in which it is found in the gas as it comes from the cells. Such residual gaseous chlorine containing a substantial proportion of $CO_2$ and known as "blow-gas" is commonly used for purposes for which chlorine of high concentration and purity is not required. This blow-gas affords a cheap source of chlorine and one which has been used for production of calcium hypochlorite; but to the best of my knowledge and belief, it has not been used for production of alkali metal hypochlorites. The use of blow-gas is permissible in my process. When blow-gas is used for chlorination of caustic alkalis, carbonate is formed simultaneously with the hypochlorite. In the case of milk of lime, the carbonate settles out and any protective effect it might exercise is lost. However, the solubility of lime is so low that it is mostly in suspension and there is customarily such a great excess present during the chlorination that little likelihood exists of chlorinating beyond the equivalence point. Moreover, calcium hypochlorite is ordinarily produced in open tanks and used as soon as the carbonate and excess lime have settled out. Hence its stability is a matter of minor importance. The principal advantage in using blow-gas for chlorination of milk of lime is therefore its relative cheapness. In the case of alkali metal hypochlorites, on the other hand, there is an additional advantage, namely, that the carbonate formed remains in solution and increases the protective alkalinity and hence the stability. The use of blow-gas constitutes a safeguard against chlorination to the acid side but not against chlorination to exhaustion of the hydroxide nor beyond the desired end point. As the $CO_2$ is accompanied by a major proportion of chlorine, such use does not enable the final adjustment of the alkalinity to be made by means of the $CO_2$. Whether the chlorination is by means of chlorine alone or blow-gas, it is therefore desirable to finish the batch in accordance with my process, i. e., by stopping the chlorination while there is still a greater excess of the hydroxide than is desired in the finished product and then reducing the excess by means of $CO_2$ or sodium or other bicarbonate.

It may seem no simpler to make the final adjustment of the alkalinity by admitting $CO_2$ under chemical control than by admitting chlorine as such or as blow-gas under similar control; but as a matter of fact, as $CO_2$ is a much milder reagent than chlorine, and one that reacts with caustic alkalis more slowly, adjustment of the alkalinity by control of the admission of $CO_2$ is much simpler than by control of the admission of the chlorine. Moreover, it has been shown that chlorination beyond exhaustion of the NaOH, even in presence of carbonate, is liable seriously and irremediably to damage the product, whereas carbonation beyond exhaustion of the NaOH does not necessarily damage the product at all.

The use of sodium bicarbonate in the final adjustment is particularly simple, as the solution can be titrated and the quantity of bicarbonate required can be calculated and weighed out with a high degree of precision and, if desired, added in solid form, thus avoiding dilution of the product. In this way the danger of either chlorinating or carbonating too far is eliminated altogether.

In practice I prefer to produce a solution containing 5 to 6 percent of NaClO by weight and 5 percent NaOH, based on the NaClO; but I may make a stronger or weaker solution and one having a greater or less proportion of hydroxide.

It is to be understood that although I have hitherto specifically mentioned only sodium hypochlorite, I do not wish to be limited thereto as other alkali metal hypochlorites may be advantageously produced by my process. Also, although I have mentioned only sodium bicarbonate as a carbonating salt, I do not wish to be limited thereto, as the other alkali metal bicarbonates may be used; also the bicarbonate used as a carbonating agent need not necessarily be that of the alkali metal from which the hydroxide is derived.

By my process therefore I am able to produce solutions of alkali metal hypochlorite, such as sodium, potassium or lithium hypochlorite by chlorination of the hydroxide, and ensure stabilization of the product by the presence of a definite excess of the original hydroxide, in any desired proportion, without the necessity for any critical control over the chlorination or any danger of over-chlorination, and for this purpose I may use the relatively cheap and dilute chlorine known as "blow-gas."

I claim as my invention:

1. The process for production of relatively stable alkali metal hypochlorites which comprises successively chlorinating alkali metal hydroxide in aqueous solution; stopping the chlorination when there still remains in the solution a greater excess of said hydroxide than would be desirable in the finished product; diminishing said excess by introduction of a chlorine free carbonating agent; and stopping the carbonation when there still remains a small but definite unreacted residue of the original hydroxide.

2. The process for production of relatively stable alkali metal hypochlorites which comprises successively chlorinating alkali metal hydroxide in aqueous solution; stopping the chlorination when there still remains in the solution a greater excess of said hydroxide than would be desirable in the finished product; diminishing said excess by introduction of chlorine free carbon dioxide; and stopping the carbonation when there still remains a small but definite unreacted residue of the original hydroxide.

3. The process for production of relatively stable alkali metal hypochlorites which comprises successively chlorinating alkali metal hydroxide in aqueous solution; stopping the chlorination when there still remains in the solution a greater excess of said hydroxide than would be desirable in the finished product; and diminishing said excess by introduction of a quantity of sodium bicarbonate, short of that necessary to neutralize all of the excess hydroxide, thus leaving a small but definite unreacted residue of the original hydroxide.

4. The process for production of relatively stable alkali metal hypochlorites which comprises successively chlorinating alkali metal hydroxide in aqueous solution; stopping the chlorination when there still remains in the solution a greater excess of said hydroxide than would be desirable in the finished product; diminishing said excess by introduction of a predetermined quantity of sodium bicarbonate calculated to leave a small but definite unreacted residue of the original hydroxide.

5. The process for production of relatively stable alkali metal hypochlorites which comprises successively chlorinating and carbonating alkali metal hydroxide in aqueous solution by means of chlorine containing a minor percentage of carbon dioxide; stopping the reaction when there still remains in the solution a greater excess of said hydroxide than would be desirable in the finished product; diminishing said excess by introduction of a chlorine free carbonating agent; and stopping the carbonation when there still remains a small but definite unreacted residue of the original hydroxide.

6. The process for production of relatively stable sodium hypochlorite which comprises successively chlorinating sodium hydroxide in aqueous solution; stopping the chlorination when there still remains in the solution a greater excess of said hydroxide than would be desirable in the finished product; diminishing said excess by introduction of a chlorine free carbonating agent; and stopping the carbonation when there still remains a small but definite unreacted residue of the original hydroxide.

7. The process for production of relatively stable sodium hypochlorite which comprises successively chlorinating sodium hydroxide in aqueous solution; stopping the chlorination when there still remains in the solution a greater excess of said hydroxide than would be desirable in the finished product; diminishing said excess by introduction of a chlorine free carbonating agent; and stopping the carbonation when there still remains an unreacted residue of the original hydroxide amounting to substantially five per cent of the weight of said hypochlorite.

BURR H. RITTER.